No. 819,389. PATENTED MAY 1, 1906.
J. D. WARREN.
ELECTRIC WIRE TERMINAL.
APPLICATION FILED MAY 2, 1905.
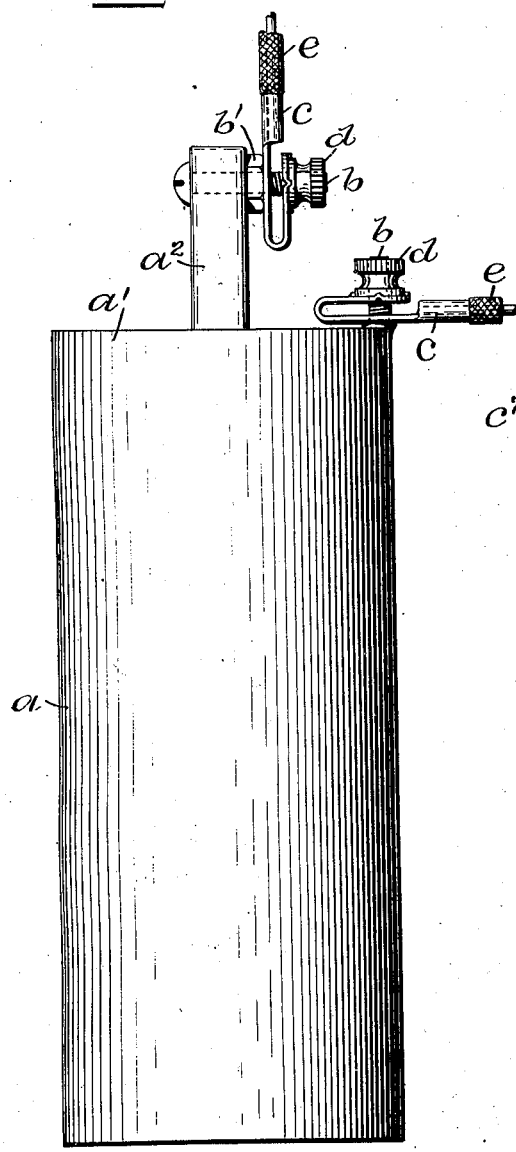
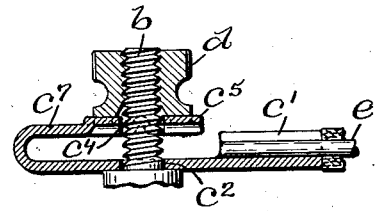
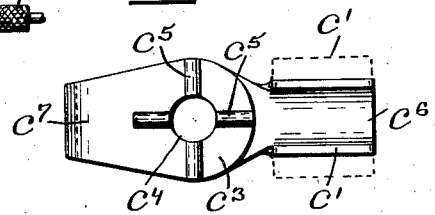
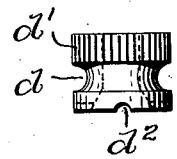
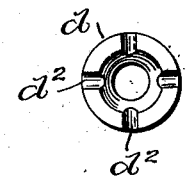
WITNESSES:
Chas. W. Luther Jr
Ada E. Hagerty
INVENTOR:
Joseph D. Warren
Joseph H. Miller Jr.
ATTORNEY.

UNITED STATES PATENT OFFICE.

JOSEPH D. WARREN, OF PROVIDENCE, RHODE ISLAND.

ELECTRIC-WIRE TERMINAL.

No. 819,389.  Specification of Letters Patent.  Patented May 1, 1906.

Application filed May 2, 1905. Serial No. 258,452.

*To all whom it may concern:*

Be it known that I, JOSEPH D. WARREN, a citizen of the United States, residing at Providence, in the county of Providence and State of Rhode Island, have invented a new and useful Improvement in Electric-Wire Terminals, of which the following is a specification.

This invention has reference to an improvement in electric-wire terminals used for connecting electric wires to the positive and negative poles of electric batteries or cells.

In the use of electric batteries or dry cells for automobile or similar purposes the connecting-wires are usually connected to the cells by twisting the end of the wire around the binding-posts on the cell and securing the same by tightening the binding-post fastener onto the wire. In practice I find that the constant jarring and vibration which the cells receive when used for this purpose tend to loosen the fasteners on the binding-posts, thus allowing the ends of the wires to work loose and break the circuit.

The object of my invention is to more securely fasten the wires to the binding-posts of the batteries than has heretofore been done, and I accomplish this object by providing the wires with an improved terminal adapted to engage with the binding-post and the binding-post fastener under spring tension, whereby the fastener is prevented from unscrewing through jars, vibrations, or similar causes.

My invention consists in the peculiar and novel construction of a terminal for electric wires and the fastener of a battery binding-post, the terminal coöperating with the fastener under spring tension to hold the fastener and prevent the same from working loose and breaking the circuit, as will be more fully set forth hereinafter.

Figure 1 is a side view of an ordinary dry cell, showing the usual binding-posts connected to the positive and negative poles of the cell provided with my improved terminals and fasteners connecting the wires to the binding-posts. Fig. 2 is an enlarged detail sectional view of my improved electric-wire terminal and fastener, showing the same secured to a binding-post broken away from the cell. Fig. 3 is an enlarged face view of my improved terminal removed from the binding-post and wire. Fig. 4 is an enlarged side view of my improved binding-post fastener, and Fig. 5 is an enlarged end view of the fastener looking at the bottom of Fig. 4.

In the drawings, $a$ indicates an ordinary dry cell, having the usual zinc shell $a'$, forming the negative pole, and the carbon plate $a^2$, forming the positive pole of the cell. A screw-threaded binding-post $b$ is secured to the negative pole or zinc shell $a'$ by soldering the same to the shell, and a binding-post $b$ is secured to the positive pole or carbon plate $a^2$ by the nut $b'$ in the usual way, as shown in Fig. 1.

My improved electric-wire terminal $c$ is stamped from sheet spring metal by dies constructed to form in the flat an elongated body having at one end the side wings $c'$ $c'$, as shown in broken lines in Fig. 3, for fastening the connecting-wire $e$ to the terminal, the hole $c^2$ for the binding-post $b$ adjacent the wings $c'$ $c'$ and the rounded end $c^3$, having the hole $c^4$ for the binding-post $b$, and the stamped-up ribs $c^5$ $c^5$, radiating from the hole $c^4$, as shown in Fig. 3. The wings $c'$ $c'$ are now bent up to form the semicircular fastening end $c^6$ and the body of the blank bent U-shaped to bring the hole $c^4$ in the end $c^3$ into a position to coincide with the hole $c^2$, as shown in Fig. 2, and form the spring-arm $c^7$, having the stamped-up ribs $c^5$ $c^5$ on the end, as shown in Fig. 3.

The binding-post fastener $d$ is constructed to screw onto the screw-threaded binding-post $b$, and has the knurled edge $d'$ and the notches $d^2$ $d^2$ in the bottom of the fastener adapted to fit the ribs $c^5$ $c^5$ on the terminal $c$.

In the use of my improved electric-wire terminal and fastener the terminal $c$ is secured to the end of the wire $e$ by placing the end of the wire $e$ in the semicircular end $c^6$ and folding the wings $c'$ $c'$ over the wire, as shown in Figs. 1 and 2. The wire may be soldered in the end $c^6$ of the terminal, if desired. The terminal is now placed on the binding-post $b$ (the binding-post extending through the holes $c^2$ and $c^4$ in the terminal) and secured by screwing the fastener $d$ onto the binding-post and against the free end of the spring-arm $c^7$. The ribs $c^5$ $c^5$ on the spring-arm now engage with the notches $d^2$ $d^2$ in the bottom of the fastener $d$ and by the tension of the spring-arm $c^7$ hold the fastener $d$ from unscrewing except by the exertion of considerable force to turn the fastener, thus securely fastening the connecting-wires to the cell.

Having thus described my invention, I claim as new and desire to secure by Letters Patent—

1. The combination of an electric-wire terminal stamped from sheet spring metal and shaped to form the side wings $c'$ $c'$, a body portion having the hole $c^2$ and bent substantially U shape to form the spring-arm $c^7$ having the rounded end $c^3$, the hole $c^4$ coinciding with the hole $c^2$ and the ribs $c^5$ $c^5$ radiating from the hole $c^4$, and a binding-post fastener $d$ constructed to screw onto a binding-post of an electric cell and having the notches $d^2$ $d^2$, whereby an electric wire is secured to the terminal by folding the wings $c'$ $c'$ over the wire, and the terminal secured to the binding-post of an electric cell by passing the binding-post through the holes $c^2$ and $c^4$ in the terminal and screwing the fastener onto the binding-post to bring the ribs $c^5$ $c^5$ on the spring-arm of the terminal into engagement with the notches $d^2$ $d^2$ in the fastener for the purpose, as described.

2. The combination with an electric cell $a$ having the binding-posts $b$ $b$ secured to the positive and negative poles of the cell, of an electric-wire terminal $c$ stamped from sheet spring metal and shaped to form the side wings $c'$ $c'$, a body portion having the hole $c^2$ and bent substantially U-shaped to form the spring-arm $c^7$ having the rounded end $c^3$, the hole $c^4$ coinciding with the hole $c^2$, and the ribs $c^5$ $c^5$ radiating from the hole $c^4$, a binding-post fastener $d$ having the notches $d^2$ $d^2$ and constructed to screw onto a binding-post $b$, whereby a wire is secured to the terminal $c$ by folding the wings $c'$ $c'$ over the wire, the terminal $c$ is secured to the binding-post and the fastener $d$ held from unscrewing by the ribs $c^5$ $c^5$ on the spring-arm $c^7$ engaging with the notches $d^2$ $d^2$ in the fastener under spring tension, as described.

In testimony whereof I have signed my name to this specification in the presence of two subscribing witnesses.

JOSEPH D. WARREN.

Witnesses:
ADA E. HAGERTY,
J. A. MILLER, Jr.